(12) United States Patent
Zeidler

(10) Patent No.: US 10,833,779 B2
(45) Date of Patent: Nov. 10, 2020

(54) REDUCING WIRELESS INTERFERENCE FROM A WIRED DIGITAL INTERFACE

(71) Applicant: ARRIS Enterprises LLC, Suwanee, GA (US)

(72) Inventor: David E. Zeidler, Warrington, PA (US)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 16/705,559

(22) Filed: Dec. 6, 2019

(65) Prior Publication Data

US 2020/0112379 A1  Apr. 9, 2020

Related U.S. Application Data

(62) Division of application No. 15/889,465, filed on Feb. 6, 2018, now Pat. No. 10,536,225.

(51) Int. Cl.
*H04B 15/00* (2006.01)
*H04W 72/02* (2009.01)
*H04N 21/4363* (2011.01)
*H04W 92/00* (2009.01)

(52) U.S. Cl.
CPC ....... *H04B 15/00* (2013.01); *H04N 21/43635* (2013.01); *H04N 21/43637* (2013.01); *H04W 72/02* (2013.01); *H04W 92/00* (2013.01)

(58) Field of Classification Search
CPC ............. H04B 15/00; H04N 21/43635; H04N 21/43637; H04W 72/02; H04W 92/00
See application file for complete search history.

(56) References Cited

U.S. PATENT DOCUMENTS

| | | | |
|---|---|---|---|
| 9,451,630 B2 * | 9/2016 | Chen | H04W 72/1215 |
| 2002/0181568 A1 * | 12/2002 | Prater | H04B 1/109 |
| | | | 375/222 |
| 2013/0344829 A1 * | 12/2013 | Rajkotia | H04B 15/00 |
| | | | 455/115.1 |
| 2019/0068918 A1 * | 2/2019 | Cornelius | H04B 3/14 |

\* cited by examiner

*Primary Examiner* — Kashif Siddiqui
(74) *Attorney, Agent, or Firm* — Buchanan, Ingersoll & Rooney P.C.

(57) ABSTRACT

Circuits and systems may be operable to provide improved wireless networking performance in the presence of a high speed wired interface. Filter circuits may be applied to wired interface leads to suppress frequency content that may interfere with wireless home networking. High speed digital wired interface systems on a chip may similarly be altered to suppress interfering frequency content before it leaves the chip. Systems with reduced radiated energy from wired interface circuits in frequencies of interest to wireless networking have improved wireless range and throughput characteristics.

8 Claims, 7 Drawing Sheets

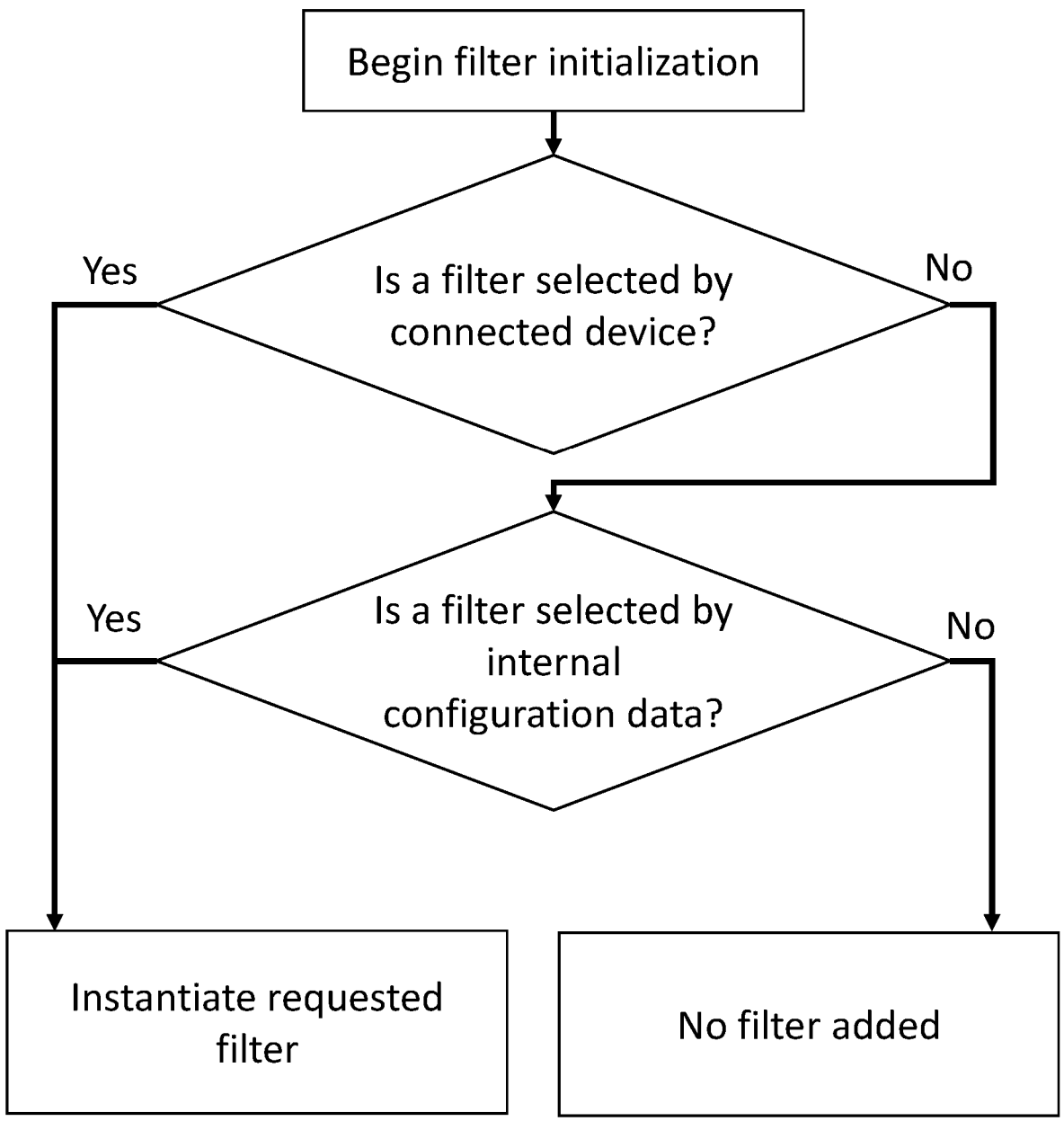

REDUCING WIRELESS INTERFERENCE FROM A WIRED DIGITAL INTERFACE

CROSS-REFERENCE TO RELATED APPLICATIONS

This application is a division of U.S. application Ser. No. 15/889,465, filed on Feb. 6, 2018, the contents of which are incorporated herein.

TECHNICAL FIELD

This disclosure relates to reducing the interference generated by wired interfaces on wireless interfaces.

BACKGROUND

Wireless networking has become increasingly popular in a wide range of home electronic devices. Wireless connections such as IEEE 802.11ac® generally have enough bandwidth and robustness to pass video signals, such as between a home gateway and a set top box. Televisions also commonly have wireless interfaces to receive video content and other content. Wireless receiver sensitivity is an important product parameter, so a device supporting wireless networking may have one or more antennas incorporated into its enclosure. Also, the receiver circuitry itself may be sensitive to noise received through power or ground connections. Examples of wireless networking technologies include IEEE 802.11 (also known as Wi-Fi), Bluetooth, and Zigbee among many others. The most popular wireless interface devices operate within the Industrial, Scientific and Medical (ISM) frequency bands and the Unlicensed National Information Infrastructure (UNII) bands. The ISM bands typically used in the United States are 2.4 to 2.5 GHz and 5.725 to 5.875 GHz. The UNII bands expand the 5 GHz ISM band to 5.15 GHZ to 5.925 GHz. These frequencies are exemplary; frequency allocations are changed by the FCC periodically and new allocations, such as the Citizens Broadband Radio Service (CBRS), are often added.

In addition to the wireless interfaces used on modern consumer electronics, high speed digital wired interfaces are also common. An example high speed digital wired interface is High Definition Multimedia Interface® (HDMI), a very common and popular home networking wired interface for video delivery. An HDMI interface typically connects a set top box or other video source to a display device such as a television or video projector. An HDMI transmit interface is sourced from an integrated circuit providing an assortment of signal and clock traces to an external connector. The external HDMI connector receives the signals from the integrated circuit and deploys them in a standardized connector assembly. HDMI also specifies a receive interface on devices such as video displays or televisions. In an HDMI receive configuration, the external HDMI connector assembly receives signals and deploys the signal and clock leads onto traces on the motherboard. Those HDMI traces run to an integrated circuit that receives and processes them. Generally, though the descriptions use the example embodiment of an HDMI source device, the invention is equally applicable to an HDMI sink device. When an HDMI source device is first connected to an HDMI sink device, they exchange configuration parameters, if needed.

The frequencies of signals, including clock signals, on many wired interfaces overlap with the frequencies used by wireless interfaces. For example, while the frequency content of HDMI signals does vary depending upon the specific settings of an HDMI interface, such as resolution and frame rate, HDMI signals consistently have frequency content that overlaps with that of typical wireless interfaces. When both technologies are deployed in a single device, energy from HDMI signals may be radiated as the HDMI traces run between the integrated circuit and the HDMI connector.

Additionally, some HDMI cables have low levels of shielding, also allowing HDMI signals to radiate from the cable outside of the HDMI connector on the STB. If this radiated energy is absorbed by wireless antennas or circuitry, then that energy contributes noise to the wireless receiver, resulting in decreased wireless range and throughput. This decreased performance is detrimental to the usefulness of the product. Consumer electronic devices, such as set top boxes are under pressure to be as small and compact as possible. Display devices are under similar pressure to be thin and minimize externally visible connections. This decrease in size often forces the wired interfaces and the wireless interfaces closer together, which tends to increase radiative coupling between wired interface internal traces and external wiring with the wireless receiver assembly.

While HDMI has been discussed as an exemplary high speed digital wired interface, many other similar technologies exist. Some other examples are Multimedia over Coax Alliance (MoCA), Ethernet, and Universal Serial Bus (USB).

Therefore, a need exists for improved methods and systems to reduce wired interface interference with wireless interfaces in electronic devices.

SUMMARY OF INVENTION

Methods and apparatus are presented to reduce interference from wired interfaces with wireless interfaces in electronic devices. In embodiments, a communication apparatus containing a wired interface using a first frequency band and a wireless interface using a second frequency band is presented with a wired interface signal unit configured to produce a wired interface output signal having energy within the first frequency band, a filter configured to attenuate the wired interface output signal and an output configured to provide the attenuated wired interface output signal to an external device, such that the filter attenuates portions of the wired interface output signal which have energy in the second frequency band. In embodiments, the wired interface may be an HDMI interface, a MoCA interface, an Ethernet interface or a USB interface. In embodiments, the filter may be a bandstop filter having a stop band which attenuates portions of the wired interface output signal which have a frequency between 2.4 GHz and 2.5 GHz, or between 3.55 GHz and 3.7 GHz or between 5 GHz and 6 GHz. In other embodiments, the filter may be a lowpass filter having a passband below 2.4 GHz, or below 3.55 GHz, or below 5.15 GHz.

A method of reducing interference with a wireless communication interface from a wired interface while producing wired interface output signals is presented such that the energy content of the wired interface output signals in at least one frequency range used by the wireless communication interface is selectively reduced. In embodiments, the wired interface may be an HDMI interface, a MoCA interface, an Ethernet interface or a USB interface. In embodiments, different frequency ranges may be used. For example, the frequency range may include a portion of the band between 2.4 GHz and 2.5 GHz, or a portion of the band between 3.55 GHz and 3.7 GHz, or a portion of the band between 5 GHz and 6 GHz. In embodiments, the reduction of energy may be produced by using a digital filter before the signals of the wired interface are sent to output leads. In other embodiments, the reduction of energy may be produced by using an internal analog filter before the signals are sent to output leads. In embodiments, a selectable control may be used to enable or disable the reduction of energy, additionally a selectable control may provide the ability to select the frequency range to be affected.

In other embodiments, a non-transitory computer readable media may have instructions operable to cause one or more processors to receive a selection of a frequency band to be suppressed in a wired interface, to store the configuration data recording the selection, to select a filter appropriate to suppress the selected frequency band, and to produce a filtered wired interface signal, such that the filter suppresses frequency components of the wired interface signals which correspond with the selected frequency band.

BRIEF DESCRIPTION OF THE DRAWINGS

FIG. 4b is a graph of an eye diagram for the HDMI signal after passing through the notch filter of 4a.

FIG. 5b is a graph of an eye diagram for the HDMI signal after passing through the low pass filter of 5a.

FIG. 7 is a block diagram of a process flow for a component's filter initialization.

Like reference numbers and designations in the various drawings indicate like elements.

DETAILED DESCRIPTION

It is desirable to provide improved methods and systems for improved wireless performance in the presence of a high speed digital wired interface.

Figure 1:
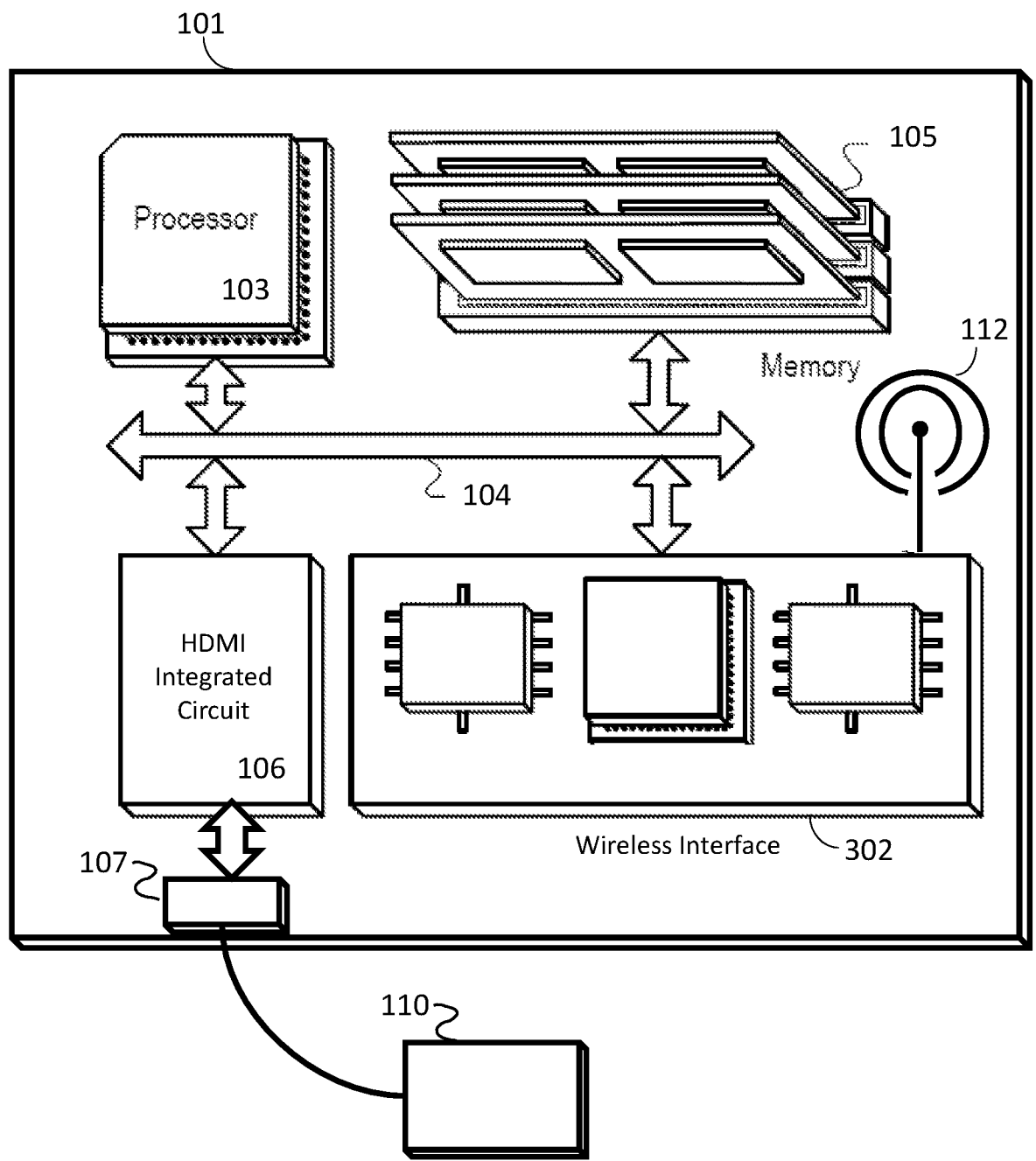
FIG. 1 is a block diagram illustrating an example set top box possessing wireless networking and an HDMI port.

FIG. 1 is a block diagram illustrating an example prior art set top box (STB) 101 with a wireless interface and an HDMI interface connected to a display device 110. While other wired interfaces are equally possible, this implementation uses an HDMI interface as an exemplary high speed digital wired interface. STB 101 may include a wireless interface 102, a processor 103, a memory 105, and an HDMI integrated circuit (IC) 106 with an HDMI connector 107. Each of the components 102, 103, 105, and 106 may, for example, be interconnected using a system bus 104. Processor 103 may be capable of processing instructions for execution within STB 101 including instructions for video processing. In one implementation, processor 103 may be a single-threaded processor. In another implementation, processor 103 may be a multi-threaded processor. Processor 103 may be capable of processing instructions stored in memory 105. Processor 103 may be capable of processing video received from wireless interface 102 for delivery to display device 110 through HDMI IC 106.

The content for an HDMI interface may be provided from a variety of sources. As an example, wireless interface 102 utilizes antenna 112 to receive wireless signals carrying information destined for STB 101. Information delivered over wireless interface 102 is provided to processor 103 over bus 104 for processing into a form suitable for delivery over HDMI interface 105 to display device 110. Video information, for example, is commonly delivered in a compressed form which must be decompressed for an HDMI interface.

Memory 105 may store information within STB 101 for the wireless interface 102 as well as processor 103. In one implementation, memory 105 may be a computer-readable medium. In one implementation, memory 105 may be a volatile memory unit. In another implementation, memory 105 may be a non-volatile memory unit. In yet another implementation, memory 105 could be a combination of both volatile and non-volatile memories.

Processor 103 provides the processed video information to HDMI integrated circuit (IC) 106 using bus 104. While HDMI IC 106 is shown as a separate block from processor 103, in other embodiments, processor 103 and HDMI IC 106 may be component parts of a single system on a chip. Such a system on a chip may include other functionality not relevant to this invention.

HDMI IC 106 receives processed video information from processor 103. HDMI IC 106 formats the information to comply with at least one of the HDMI output interface specifications. The HDMI signals produced by HDMI IC 106 are configured by initial interactions between STB 101 and display device 110 during the HDMI initialization sequence. For example, an HDMI Type A interface requires 3 differential data pairs in addition to a differential clock pair and other support signals, such as a hot swap detection lead. HDMI IC 106 provides HDMI signals to HDMI interface 107.

HDMI interface 107 is a standardized connector assembly that allows a cable to be connected to an external device, such as a display for STB 101. HDMI interface 107 is connected to HDMI IC 106 by a bus made up of multiple traces with signal and clock leads.

Figure 2A:
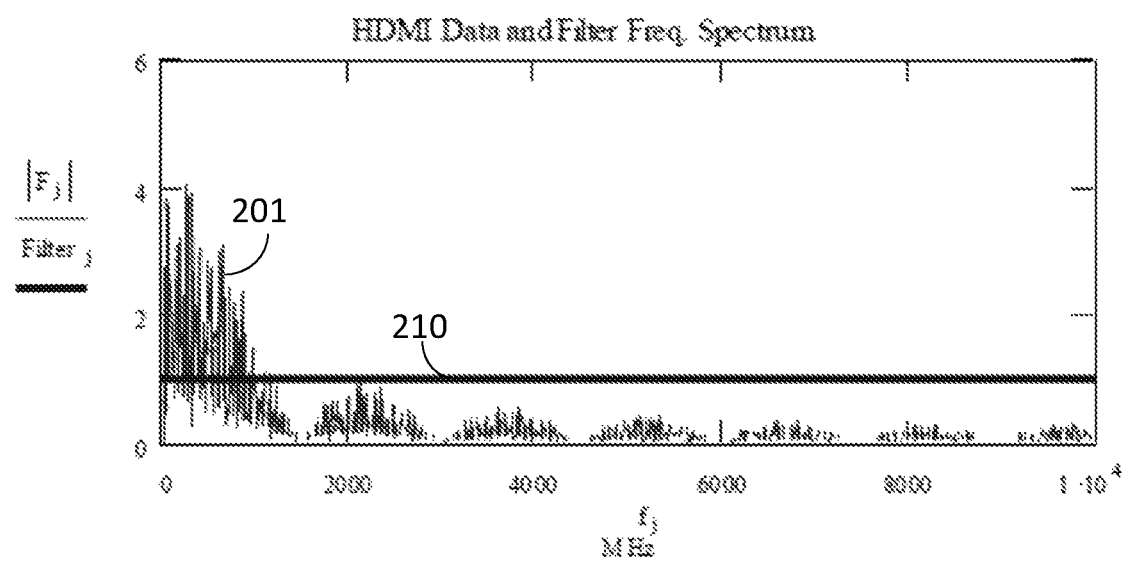
FIG. 2a is a graph illustrating the frequency components of an example unaltered HDMI signal.

FIG. 2a is an illustration of a typical 1080P60 HDMI data signal's frequency components simulated passing through an all-pass filter denoted by the broad line 210. HDMI signal 201 has frequency components that extend up through 10 GHz. High speed digital interface signals commonly have high frequency content that may have some periodic tendencies, as HDMI signal 201 does in the FIG. 2a. Line 210 indicates the all-pass filter applied to the signal. Wireless home networking for video signals is often in the UNII band around 5 GHz. This figure shows HDMI signal 201 has substantial energy in that frequency range. Other bands of potential interest for wireless home networking include the ISM band around 2.4 GHz and the Citizens Broadband Radio Service (CBRS) band around 3.5 GHz. Any of these bands also may be exposed to energy from an HDMI signal.

Figure 2B:
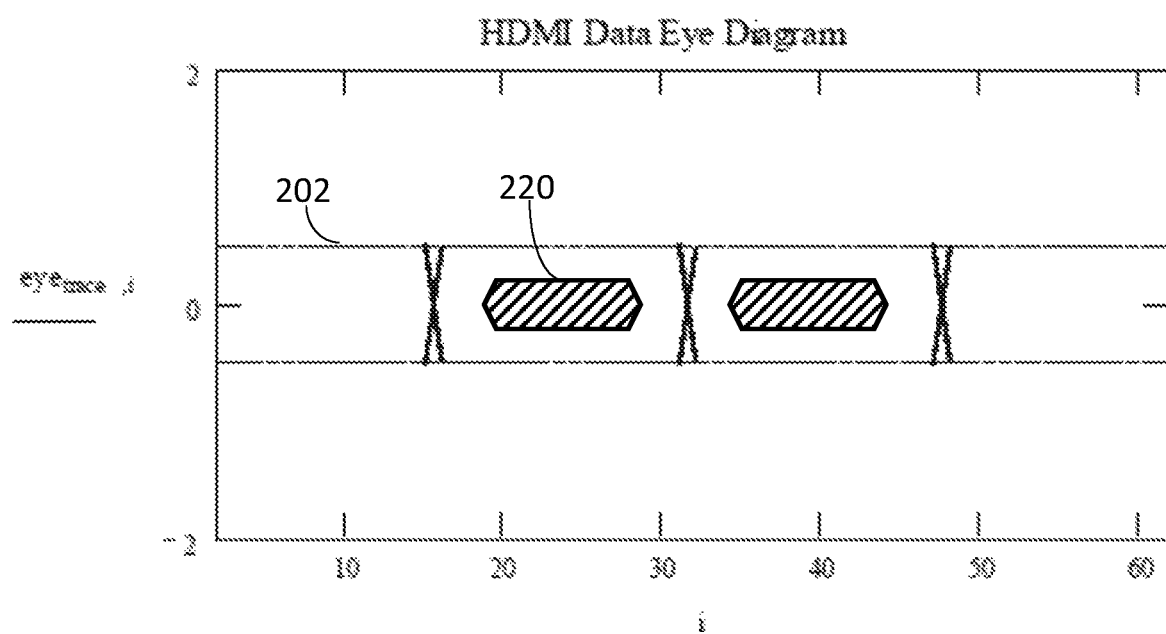
FIG. 2b is a graph of an eye diagram for an example unaltered HDMI signal.

FIG. 2b is an illustration of the same simulated HDMI signal, now denoted HDMI signal 202, in the time domain, also known as an eye diagram. The HDMI specifications do not specify the energy required in the frequency bands illustrated in FIG. 2a, but instead place requirements upon the eye diagram shown in FIG. 2b. The HDMI specification requirements are embodied in polygon 220. To be compliant with HDMI specifications, eye diagram 202 must not impinge on polygon 220. Note that while the graphs used in this description are from a simulation of a 1080P60 HDMI interface, other HDMI modes such as 4KP60 have similar characteristics.

Figure 3:
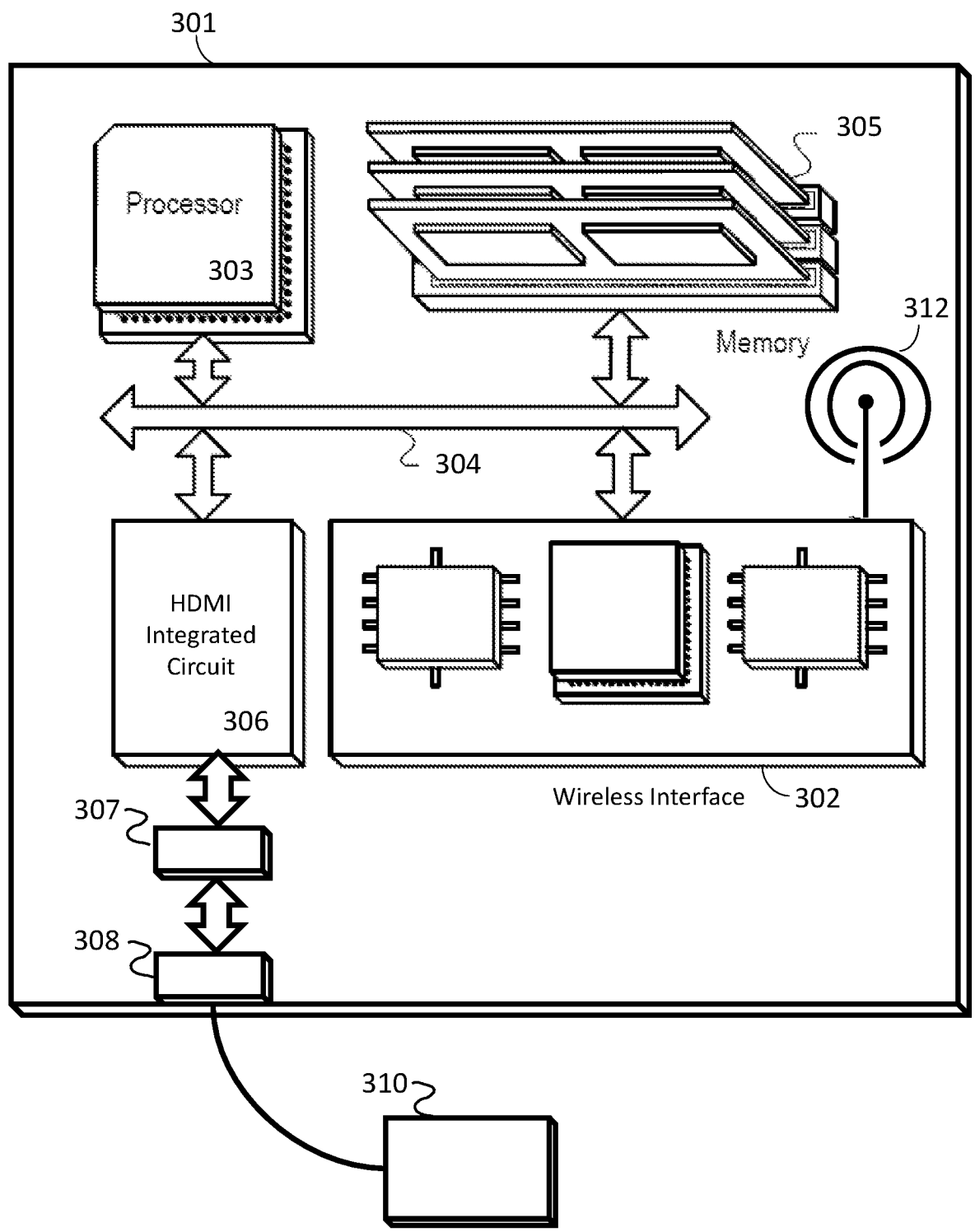
FIG. 3 is a block diagram illustrating an example set top box possessing wireless networking, and an HDMI port and an HDMI filter circuit.

FIG. 3 illustrates a block diagram of an improved STB 301 with reduced exposure to wireless interference from HDMI signals connected to a display device 310. While other wired interfaces are equally possible, this implementation uses an HDMI interface as an exemplary wired interface.

In STB 301, the wireless interface 302 provides network connectivity for STB 301 to receive multimedia content from a wireless home network. As discussed earlier, in embodiments, wireless interface 302 may operate in a single wireless band, such as the 5 GHz UNIT band. Other embodiments may utilize other unlicensed or licensed bands with wireless interface 302. While this diagram illustrates a system with a single antenna, in embodiments there may be several antennas for a single radio band. Also, STB 301 may support more than one frequency band with different antennas for each band.

The content for an HDMI interface may be provided from a variety of sources. In this example implementation, wireless interface 302 utilizes antenna 312 to receive wireless signals carrying information destined for STB 301. In embodiments, information delivered over wireless interface 302 may be provided to processor 303 for processing into a form suitable for delivery over HDMI interface 308 to display device 310. Processor 303 provides the processed video information to HDMI integrated circuit (IC) 306. While in this embodiment HDMI IC is shown as a separate block from processor 303, in other embodiments, processor 303 and HDMI IC 306 may be component parts of a single system on a chip. Such a system on a chip may include other functionality not relevant to this invention.

In embodiments, HDMI IC 306 receives processed video information from processor 303. HDMI IC 306 may format the information to comply with at least one of the HDMI output interface specifications. For example, an HDMI Type A interface requires 3 differential data pairs in addition to a differential clock pair and other support signals, such as a hot swap detection lead. HDMI IC 306 provides HDMI signals to HDMI filter circuit 307.

In embodiments, HDMI filter circuit 307 suppresses the energy of the HDMI compliant signals in the band or bands likely to cause interference with wireless interface 302. In other embodiments, the functionality of HDMI filter circuit 307 could be included in an HDMI companion chip, such as the Texas Instruments TPD12S016. A companion chip in the prior art provides output protection from static discharge or other adverse conditions for HDMI ICs, such as HDMI IC 306.

In embodiments, after the HDMI filter circuit 307, the HDMI traces, which may include signal data and clock signals, are continued to HDMI interface 308. HDMI interface 308 is a standardized connector assembly that allows a cable to be connected to display device 310.

Different forms are possible for HDMI filter circuit 307 that would still be in accordance with this invention. When describing a filter, it is common to use the term passband for the frequencies allowed to pass through without significant attenuation and the term stopband for those frequencies attenuated significantly by the filter. In embodiments, HDMI filter circuit 307 could take the form of a notch or bandstop filter that suppresses signal energy only a single block or band of frequencies.

Figure 4A:
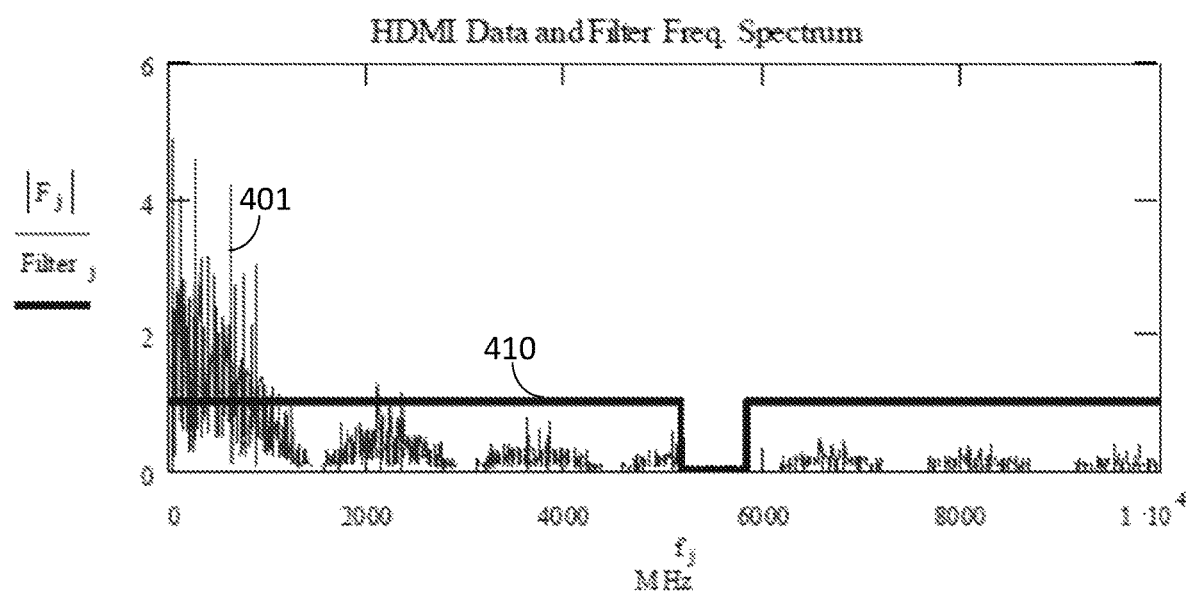
FIG. 4a is a graph illustrating a notch filter with reference to an HDMI signal.
Figure 4B:
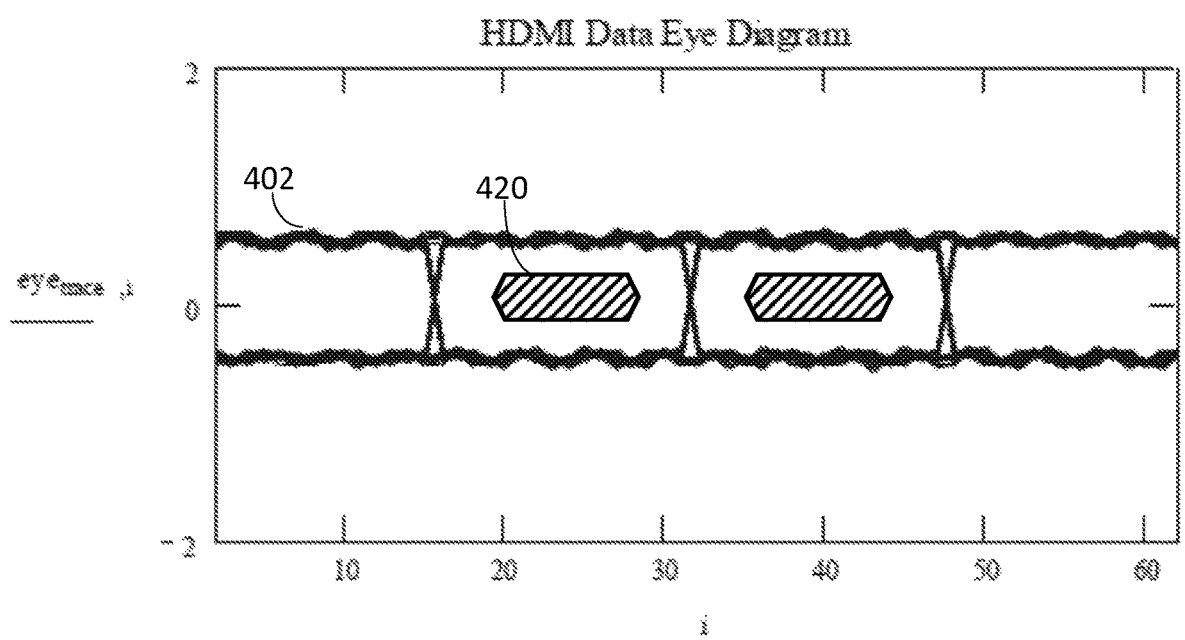

FIG. 4a illustrates an example notch filter embodiment with the notch centered on the ISM UNIT band from 5.15 GHz to 5.85 GHz. HDMI signal 401 is shown with notch filter 410. The attenuated portion of HDMI signal 401 is shown as completely suppressed, while in a realistic embodiment some energy would typically remain. Eye diagram 402 in FIG. 4b shows a time domain representation of HDMI signal 401 that has passed through filter 410 of FIG. 4a. While the removal of that band of high frequencies does affect the eye diagram, eye diagram 402 is still compliant with HDMI requirement polygon 420.

A notch circuit is well known to be more challenging and costly to produce than a low pass filter. In embodiments, HDMI filter circuit 307 could alternatively take the form of a low pass filter that allows all frequencies below the wireless band of interest to pass, but attenuates all frequencies above the beginning of that band.

Figure 5A:
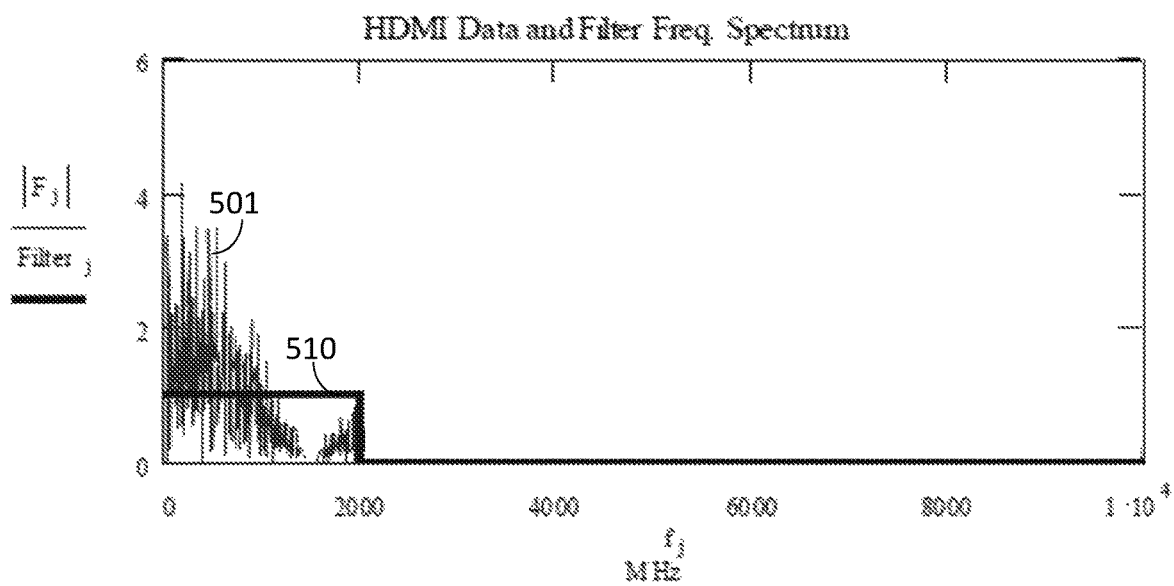
FIG. 5a is a graph illustrating a low pass filter with reference to an HDMI signal.
Figure 5B:
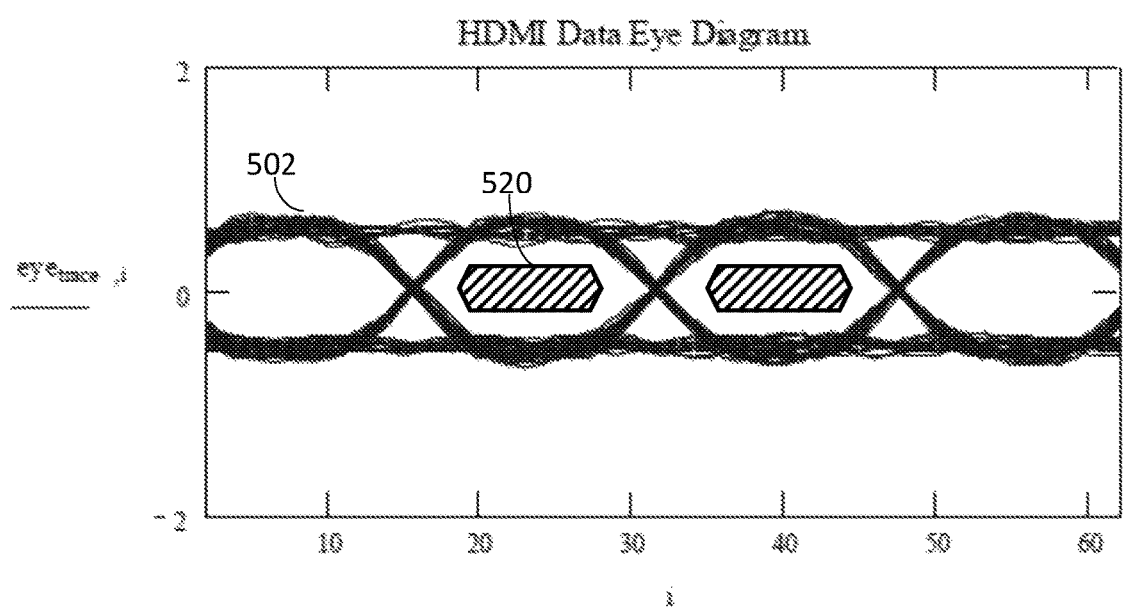

FIG. 5a illustrates one example embodiment with a low pass filter that allows frequencies below the ISM band which begins at 2.4 GHz to pass with minimal attenuation but attenuates frequencies above 2.4 GHz. HDMI signal 501 is attenuated by low pass filter 510 in those higher frequencies. FIG. 5b shows the eye diagram of HDMI signal 501 that has passed through low pass filter 510. The exemplary eye diagram 502 of HDMI signal 501 is degraded from the unfiltered eye diagram example from FIG. 2b, but for uses where eye diagram 502 avoids overlap with polygon 520, this signal is advantageous since it also eliminates frequencies that might cause wireless interference. A person of skill in the art of RF filters would understand that a real filter has slope from the passband to the stop band. A realizable filter might have a knee at 2.3 GHz and a slope of 20 dB per decade. Other filters are possible in embodiments and would be recognized as providing the same signal suppression in one or more of the available wireless bands. While an HDMI wired interface is used as an example implementation, other digital wired interfaces may similarly allow filtering of their signal spectra to reduce wireless interference without rendering the signals noncompliant with their respective standards.

Figure 6:
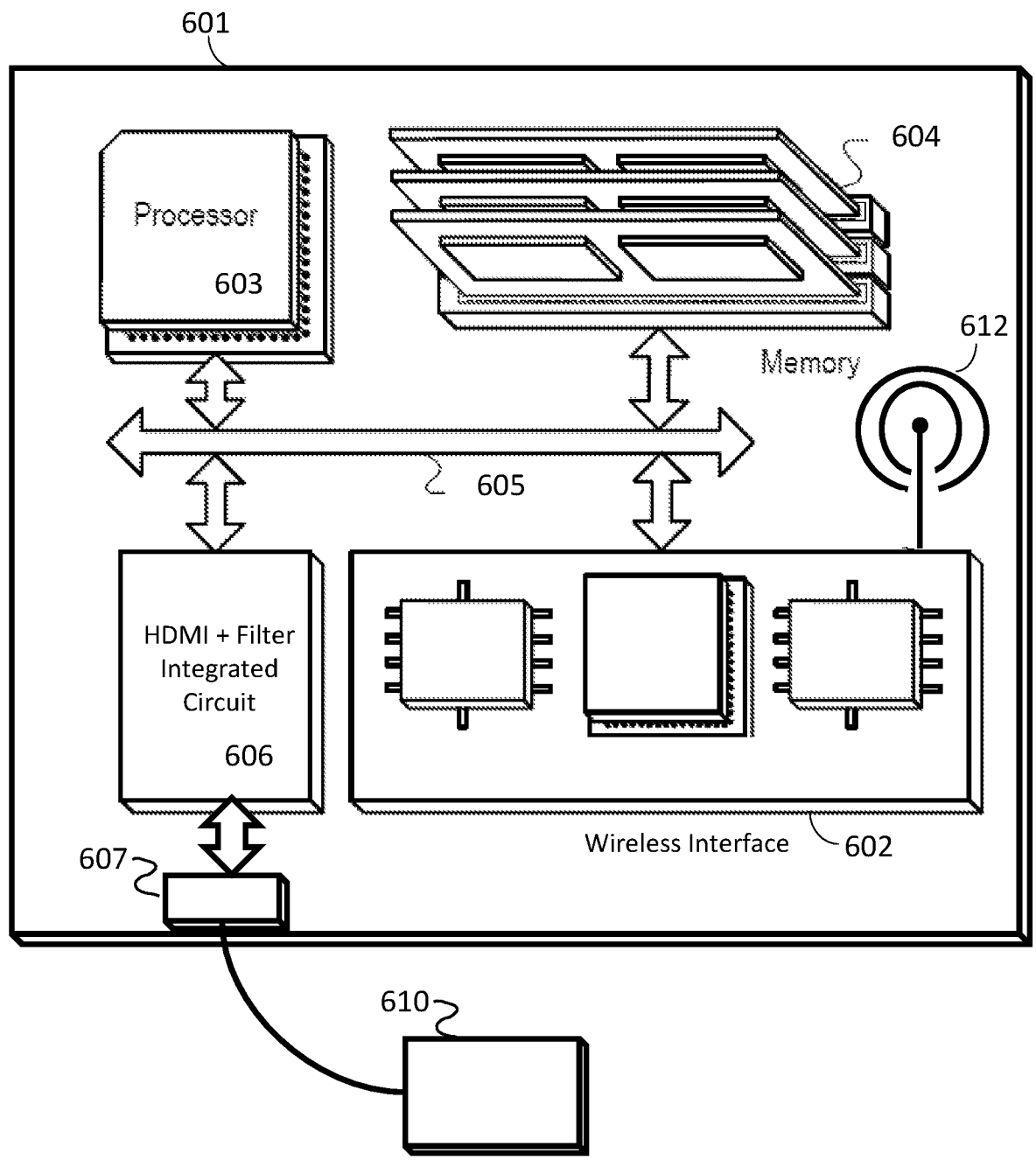
FIG. 6 is a block diagram illustrating an example hardware platform operable with reduced wireless interference from an improved HDMI integrated circuit.

FIG. 6 is a block diagram of an alternative embodiment STB 601 operable to reduce the wireless interference of an HDMI interface connected to a display device 610. While other wired interfaces are equally possible, this implementation uses an HDMI interface as an exemplary wired interface.

In embodiments, processor 603 may be capable of processing instructions for execution within STB 601 including instructions for video processing. Processor 603 may be capable of processing video received from wireless interface 602 for delivery to an external display through HDMI+Filter IC 606.

Information delivered over wireless interface 602 is provided to processor 603 over bus 605 for processing into a form suitable for delivery over HDMI interface 607 to display device 610.

Memory 604 may store configuration information within STB 601 for the wireless interface 602 as well as processor 603.

Processor 603 provides the processed video information to HDMI+Filter IC 606. While HDMI IC 606 is shown as a separate block from video processor 603, in other embodiments, processor 603 and HDMI IC 606 may be component parts of a single system on a chip. Such a system on a chip may include other functionality not relevant to this invention.

HDMI+Filter IC 606 receives processed video information from processor 603. HDMI+Filter IC 606 is capable of providing video and audio information to display device 610 via an HDMI-compliant connector. In some embodiments, to reduce interference with wireless interface 602, HDMI+ Filter IC 606 incorporates additional signal processing to suppress or attenuate portions of the HDMI signals that would otherwise interfere with the wireless interface 602. In embodiments, the signal processing may result in the elimination of signal energy in a band of frequencies similar to the implementation of an external notch filter. In other embodiments, the signal processing may result in the removal or attenuation of signal energy in frequencies above a certain frequency, similar to the implementation of an external low pass filter. The selection of which embodiments are enacted by HDMI+Filter IC 606 may be configured by processor 603. Processor 603 may select a filter embodiment based on an internal configuration, such as that of wireless interface 602, or the selection may be made based upon information received from the connected display device 610. An example process for that decision is discussed with FIG. 7. Other embodiments to selectively attenuate the signal energy in frequencies within the larger output spectra may occur to those skilled in the art of digital signal processing. In embodiments, HDMI+Filter IC 606 may comprise a single chip implementation. In other implementations, the functionality of HDMI+Filter IC 606 may be part of a multi-chip module. In still other implementations, the functionality of HDMI+Filter IC 606 may be integrated within processor 603.

HDMI interface 607 is a standardized connector assembly that allows a cable to be connected to display device 610. HDMI interface 607 is connected to HDMI+Filter IC 606 by a bus made up of multiple traces comprising signal and clock leads.

Turning to FIG. 7, an example process is presented allowing a component with a programmable filter, such as HDMI+Filter IC 606, to be configured for operation. In step 701, the IC component enters a filter initialization mode. In embodiments, this mode may be triggered by the application of power to the IC or by a configuration trigger from an internal or external source. As an example, if display device 610 is turned on, the initialization of the HDMI link to HDMI interface 607 and HDMI+Filter IC 606 could trigger a filter initialization.

In step 702, the component determines if a filter has been selected by a connected device. Not all embodiments may support filter selection by a connected device. If an embodiment supports filter selection by a connected device, then the component may determine that a connected device has selected a filter to be instantiated by the component. In embodiments, the component may support a limited set of filters for activation. For example, a component may support only a low pass filter with a cut off of 5 GHz that can be activated or not. Alternatively, a component might support a programmable notch filter whose bandwidth and center frequency were selectable between 2.4 GHz and 5.5 GHz. In embodiments, the determination that a connected device has selected a filter may be made based upon configuration settings communicated over the wired link during initialization. Alternatively, another wired or wireless link may be used by the connected device if the wired link is not available for communication until initialization is complete. If the component determines that a filter has been selected by the connected device, then the process continues to step 704. It should be noted that in some embodiments, a connected device may be able to select an all-pass filter which is the effective selection of no filter on the output signals. If the component determines that the connected device has not selected a filter, then the process continues to step 703.

In step 703, the component determines if internal configuration data indicates that a filter has been selected. In embodiments, the internal configuration data may be provided to the component at initialization by an external management system. In other embodiments, the component may have a stored configuration that instructs the component as to which filter, if any to instantiate. If a filter is required by internal configuration data, the process continues to step 704. If not, the process continues to step 705.

In step 704, the component instantiates the selected filter. In embodiments, the component may make use of various well-known digital signal processing techniques to provide the requested filter on the appropriate signals, including for example software-defined filters. Many techniques are known to those skilled in the art of digital signal processing to suppress energy content of a signal in selected frequency bands, which is the essence of a filter.

In step 705, the component does not instantiate a filter on the outgoing signals. In embodiments, the lack of filtering may be implemented by an all-pass filter. In other embodiments, the component may simply not activate any additional filtering of the appropriate signals.

Those skilled in the art will appreciate that the invention described herein reduces the interference of wired interfaces with wireless interfaces. The embodiments presented illustrate that the invention may be implemented through many different embodiments in order to reduce, for example, interference from HDMI wired interfaces with wireless interfaces by reducing the energy of the HDMI signal in frequency bands also used by wireless interfaces. Typical high speed wired interface designs seek to optimize an eye pattern without regard to its inherent frequency components. Those frequency components are typically only evaluated against broad spectrum radiated emission standards, such as FCC Part 15. The general radiated emissions standards have no additional restrictions for radiation in the unlicensed ISM and UNIT bands used for wireless interfaces. The embodiments presented use controlled degradation of the eye pattern resulting from suppression of specific frequency bands to both provide a compliant wired signal as well as reduced wireless interference.

The subject matter of this disclosure, and components thereof, may be realized by instructions that upon execution cause one or more processing devices to carry out the processes and functions described above. Such instructions may, for example, comprise interpreted instructions, such as script instructions, e.g., JavaScript or ECMAScript instructions, or executable code, or other instructions stored in a computer readable medium.

Implementations of the subject matter and the functional operations described in this specification may be provided in digital electronic circuitry, or in computer software, firmware, or hardware, including the structures disclosed in this specification and their structural equivalents, or in combinations of one or more of them. Embodiments of the subject matter described in this specification may be implemented as one or more computer program products, i.e., one or more modules of computer program instructions encoded on a tangible program carrier for execution by, or to control the operation of, data processing apparatus.

A computer program (also known as a program, software, software application, script, or code) may be written in any form of programming language, including compiled or interpreted languages, or declarative or procedural languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows may also be performed by, and apparatus may also be implemented as special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory may be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, the separation of various system components in the embodiments described above should not be understood as requiring such separation in all embodiments, and it should be understood that the described program components and systems may generally be integrated together in a single software product or packaged into multiple software products.

Particular embodiments of the subject matter described in this specification have been described. Other embodiments are within the scope of the following claims. For example, the actions recited in the claims may be performed in a different order and still achieve desirable results, unless expressly noted otherwise. As one example, though a single wireless interface and a single HDMI interface are illustrated in the examples, the principles of the invention are equally applicable to device with multiple wireless interfaces or multiple HDMI interfaces. Although, the examples given illustrate the improvements possible in the 5 GHz UNIT band, the invention is equally applicable to wireless interfaces using the 2.4 GHz ISM band or to devices that have more than one wireless interface. In some implementations, multitasking and parallel processing may be advantageous.

I claim:

1. A communication apparatus containing a wired interface using a first frequency band and a wireless interface using a second frequency band, the communication apparatus comprising:
   a wired interface signal unit configured to produce a wired interface output signal having energy within the first frequency band;
   a wireless interface signal unit configured to communicate using the second frequency band;
   a filter selectively configured to attenuate the wired interface output signal;
   a processor operatively coupled to the filter and a memory with configuration data; and
   an output configured to provide the attenuated wired interface output signal to an external device, wherein the processor instructs the filter to attenuate portions of the wired interface output signal which have energy in the second frequency band if the configuration data indicates that the second frequency band is in use by the wireless interface.

2. The circuit of claim 1, wherein the wired interface is one of an HDMI interface, a MoCA interface, an Ethernet interface or a USB interface.

3. The circuit of claim 1, wherein:
   the filter is a bandstop filter having a stop band which attenuates portions of the wired interface output signal which have a frequency between 2.4 GHz and 2.5 GHz.

4. The circuit of claim 1, wherein:
   the filter is a bandstop filter having a stop band which attenuates portions of the wired interface output signal which have a frequency between 3.55 GHz and 3.7 GHz.

5. The circuit of claim 1, wherein:
   the filter is a bandstop filter having a stop band which attenuates portions of the wired interface output signal which have a frequency between 5 GHz and 6 GHz.

6. The circuit of claim 1, wherein:
   the filter is a lowpass filter having a passband below 2.4 GHz.

7. The circuit of claim 1, wherein:
   the filter is a lowpass filter having a passband below 3.55 GHz.

8. The circuit of claim 1, wherein;
   the filter is a lowpass filter having a passband below 5.15 GHz.

* * * * *